(12) United States Patent
Tomita et al.

(10) Patent No.: US 11,362,817 B2
(45) Date of Patent: Jun. 14, 2022

(54) QUANTUM CRYPTOGRAPHIC KEY OUTPUT APPARATUS, QUANTUM CRYPTOGRAPHIC KEY COMMUNICATION SYSTEM, AND QUANTUM CRYPTOGRAPHIC KEY OUTPUT METHOD

(71) Applicant: NATIONAL UNIVERSITY CORPORATION HOKKAIDO UNIVERSITY, Sapporo (JP)

(72) Inventors: Akihisa Tomita, Sapporo (JP); Kensuke Nakata, Sapporo (JP)

(73) Assignee: NATIONAL UNIVERSITY CORPORATION HOKKAIDO UNIVERSITY, Sapporo (JP)

(*) Notice: Subject to any disclaimer, the term of this patent is extended or adjusted under 35 U.S.C. 154(b) by 767 days.

(21) Appl. No.: 16/330,153

(22) PCT Filed: Sep. 4, 2017

(86) PCT No.: PCT/JP2017/031800
§ 371 (c)(1),
(2) Date: Mar. 4, 2019

(87) PCT Pub. No.: WO2018/043742
PCT Pub. Date: Mar. 8, 2018

(65) Prior Publication Data
US 2019/0190707 A1    Jun. 20, 2019

(30) Foreign Application Priority Data
Sep. 5, 2016 (JP) .............................. JP2016-173063

(51) Int. Cl.
*H04L 9/08* (2006.01)
*H04L 9/12* (2006.01)
(Continued)

(52) U.S. Cl.
CPC ............ *H04L 9/0852* (2013.01); *G02F 1/035* (2013.01); *H01S 3/0007* (2013.01); *H04B 10/70* (2013.01); *H04L 9/12* (2013.01)

(58) Field of Classification Search
CPC ....... H04L 9/0852; H04L 9/12; H04L 9/0662; H04L 9/0858; G02F 1/035; H01S 3/0007; H04B 10/70
See application file for complete search history.

(56) References Cited

U.S. PATENT DOCUMENTS 9,794,065 B2   10/2017  Wabnig et al.
2002/0025041 A1*  2/2002  Tomita .................. H04L 9/0662
                                                    380/256
(Continued)

FOREIGN PATENT DOCUMENTS

CN    104737491 A    6/2015
JP    2009-515421 A  4/2009
(Continued)

OTHER PUBLICATIONS

Akihisa Tomita, "Implementation of Quantum Key Distribution Systems", The Transactions of the Institute of Electronics, Information and Communication Engineers A, May 1, 2007, vol. J90-A, No. 5, pp. 358-366, 13 pages total.
(Continued)

*Primary Examiner* — Brian F Shaw
(74) *Attorney, Agent, or Firm* — Sughrue Mion, PLLC (57) ABSTRACT

A quantum cryptographic key output apparatus includes a semiconductor laser device that repeatedly generates pulsed laser light, an encoder that encodes the pulsed laser light based on a quantum cryptographic key, an optical branching unit that branches the pulsed laser light, and an attenuator that attenuates a light intensity of first pulsed laser light so that the number of photons of the first pulsed laser light has any one of a plurality of candidate values that are values
(Continued)

equal to or smaller than 1. Further, the output apparatus includes a light intensity determination unit that determines whether or not a light intensity of a second pulsed laser light is in a predetermined range, and an information output unit that outputs specifying information for specifying the first pulsed laser light corresponding to second pulsed laser light of which the light intensity is not in the predetermined range to an input apparatus.

8 Claims, 4 Drawing Sheets

(51) Int. Cl.
*H04B 10/70* (2013.01)
*G02F 1/035* (2006.01)
*H01S 3/00* (2006.01)

(56) References Cited

U.S. PATENT DOCUMENTS

2012/0195430 A1 8/2012 Niskanen et al.
2018/0306574 A1* 10/2018 Kim .................. G01B 11/2441

FOREIGN PATENT DOCUMENTS

| | | |
|---|---|---|
| JP | 2009-194833 A | 8/2009 |
| JP | 2016-46557 A | 4/2016 |
| WO | 2008/015758 A1 | 2/2008 |

OTHER PUBLICATIONS

International Search Report dated Nov. 17, 2018 issued by the International Searching Authority in PCT/JP2017/031800.
International Preliminary Report on Patentability with the translation of Written Opinion dated Mar. 14, 2019 issued by the International Bureau in PCT/JP2017/031800.

* cited by examiner

QUANTUM CRYPTOGRAPHIC KEY OUTPUT APPARATUS, QUANTUM CRYPTOGRAPHIC KEY COMMUNICATION SYSTEM, AND QUANTUM CRYPTOGRAPHIC KEY OUTPUT METHOD

CROSS REFERENCE TO RELATED APPLICATIONS

This application is a National Stage of International Application No. PCT/JP2017/031800 filed Sep. 4, 2017, claiming priority based on Japanese Patent Application No. 2016-173063 filed Sep. 5, 2016.

TECHNICAL FIELD

An embodiment of the present invention relates to a quantum cryptographic key output apparatus, a quantum cryptographic key communication system, and a quantum cryptographic key output method.

BACKGROUND ART

A quantum cryptographic key communication system for transmitting information safely in an information theoretical manner is known. In the quantum cryptographic key communication system, a sender of information transmits a quantum cryptographic key consisting of photons to a recipient through quantum key distribution (QKD). Further, the sender encrypts information to be transmitted to the recipient using the quantum cryptographic key, and transmits the encrypted information to the recipient using arbitrary communication means. Then, the recipient decrypts the encrypted information using the quantum cryptographic key. Thus, information is transmitted from the sender to the recipient. Here, when the quantum cryptographic key is tapped by a third party When the quantum cryptographic key is transmitted from the sender to the receiver, a quantum state of photons constituting the quantum cryptographic key changes according to an uncertainty principle. Therefore, traces of tapping always remain in the photons constituting the tapped quantum cryptographic key, and the sender and recipient can reliably detect the tapping of the quantum cryptographic key.

In the quantum key distribution, a key distillation process is executed for the quantum cryptographic key transmitted from the sender to the recipient. The key distillation process includes error correction for correcting the error of the quantum cryptographic key caused by tapping, noise, or the like, and confidentiality enhancement for generating a quantum cryptographic key of which information can be presumed not to have leaked, from the quantum cryptographic key of which information is likely to have leaked due to tapping or the like. In the confidentiality enhancement, an upper limit of the amount of information on the quantum cryptographic key of which the information is likely to have leaked (the amount of leakage information) is estimated, and the amount of information on the quantum cryptographic key is reduced according to the estimated upper limit of the amount of leakage information, thereby improving security of the quantum cryptographic key. As described above, in the quantum key distribution, it is possible to transmit information safely in an information theoretical manner.

A quantum cryptographic key communication system capable of executing such quantum key distribution. Which includes a light source that adopts Decoy BB84 protocol and repeatedly generates pulsed laser light, an encoder that encodes the pulsed laser light and generates a light pulse having information on a cryptographic key, and an attenuation unit that attenuates a light intensity of the pulsed laser light so that the number of photons of the pulsed laser light has any one of a plurality of candidate values that are values equal to or smaller than 1 is known (see for example Patent Literature 1).

CITATION LIST

Patent Literature

[Patent Literature 1]
Japanese Unexamined Patent Publication No. 2016-46557

SUMMARY OF INVENTION

Technical Problem

Incidentally, in such a quantum cryptographic key communication system, the upper limit of the amount of leakage information is estimated on the assumption that an average number of photons of the pulsed laser light constituting the quantum cryptographic key matches the candidate value. However, an actual number of photons of the pulsed laser light constituting the quantum cryptographic key includes an error with respect to the candidate value. As causes of the error of the number of photons, for example, a fluctuation in an output intensity of the light source and a variation in a voltage supplied to the encoder are conceivable. Here, when safety is evaluated in an information theoretical manner in transmission of information, estimation is performed so that the amount of leakage information is largest in a range of errors of a number of photons, such that safety can he guaranteed even when there is an error. Therefore, when the error of the number of photons is larger, the upper limit of the amount of leakage information is estimated to be greater, and the amount of information on the quantum cryptographic key to be reduced in the confidentiality enhancement increases. As a result, there is a problem in that a generation rate of the quantum cryptographic key decreases.

An aspect of the present invention has been made in view of the above problems, and an object of the present invention is to provide a quantum cryptographic key output apparatus, a quantum cryptographic key communication system, and a quantum cryptographic key output method capable of improving a generation rate of a quantum cryptographic key.

Solution to Problem

A quantum cryptographic key output apparatus according to an aspect of the present invention is a quantum cryptographic key output apparatus that generates encoded pulsed laser light to be used for generation of a quantum cryptographic key and outputs a light pulse train consisting of the pulsed laser light to a quantum cryptographic key input apparatus, the quantum cryptographic key output apparatus including: a light source that repeatedly generates the pulsed laser light; an encoder that encodes the pulsed laser light on the basis of the quantum cryptographic key; an optical branching unit that branches the encoded pulsed laser light to a first optical path and a second optical path at a predetermined light intensity ratio; an attenuation unit that attenuates a light intensity of first pulsed laser light that is the pulsed laser light branched to the first optical path so that the number of photons of the first pulsed laser light has any one of a plurality of candidate values that are values equal to or smaller than 1; a light output unit that outputs the first pulsed laser light of which the light intensity has been attenuated by the attenuation unit to the quantum cryptographic key input apparatus; a light intensity determination unit that determines whether or not a light intensity of a second pulsed laser light that is the pulsed laser light branched to the second optical path is in a predetermined range; and an information output unit that outputs specifying information for specifying the first pulsed laser light corresponding to the second pulsed laser light of which the light intensity is determined not to be in the predetermined range by the light intensity determination unit to the quantum cryptographic key input apparatus.

Alternatively, a quantum cryptographic key communication system according to an aspect of the present invention includes the quantum cryptographic key output apparatus; and a quantum cryptographic key input apparatus that receives the light pulse train output by the quantum cryptographic key output apparatus, wherein the quantum cryptographic key input apparatus includes a light input unit that receives the first pulsed laser light output by the light output unit, an information input unit that receives the specifying information output by the information output unit, and a key distillation unit that excludes the first pulsed laser light that is specified by the specifying information received by the information input unit from the first pulsed laser light received by the light input unit, and uses the first pulsed laser light as a new quantum cryptographic key.

Alternatively, a quantum cryptographic key output method according to an aspect of the present invention is a quantum cryptographic key output method for generating encoded pulsed laser light to be used for generation of a quantum cryptographic key and outputting a light pulse train consisting of the pulsed laser light to a quantum cryptographic key input apparatus, the quantum cryptographic key output method including: an emission step of repeatedly generating the pulsed laser light; an encoding step of encoding the pulsed laser light on the basis of the quantum cryptographic key; an optical branching step of branching the encoded pulsed laser light to a first optical path and a second optical path at a predetermined light intensity ratio; an attenuation step of attenuating a light intensity of first pulsed laser light that is the pulsed laser light branched to the first optical path so that the number of photons of the first pulsed laser light has any one of a plurality of candidate values that are values equal to or smaller than 1; a light output step of outputting the first pulsed laser light of Which the light intensity has been attenuated to the quantum cryptographic key input apparatus; a light intensity determination step of determining whether or not a light intensity of second pulsed laser light that is the pulsed laser light branched to the second optical path is in a predetermined range; and an information output step of outputting specifying information for specifying the first pulsed laser light corresponding to the second pulsed laser light of which the light intensity is determined not to be in the predetermined range to the quantum cryptographic key input apparatus.

In any one of the quantum cryptographic key output apparatus, the quantum cryptographic key communication system, and the quantum cryptographic key output method, the pulsed laser light repeatedly generated by the light source is encoded by the encoder on the basis of the quantum cryptographic key, and the pulsed laser light is branched to the first optical path and the second optical path at a predetermined light intensity ratio by the optical branching unit. The light intensity of the first pulsed laser light that is the pulsed laser light branched to the first optical path is attenuated by the attenuation unit, and the light pulse train consisting of the first pulsed laser light is transmitted to the quantum cryptographic key input apparatus by the light output unit. Here, when the light intensity determination unit determines that the light intensity of the second pulsed laser light that is the pulsed laser light branched to the second optical path is not in the predetermined range, the information output unit outputs specifying information for specifying the first pulsed laser light corresponding to the second pulsed laser light to the quantum cryptographic key input apparatus. Since the first pulsed laser light and the second pulsed laser light are pulsed laser light obtained by the optical branching unit branching the same pulsed laser light at a predetermined light intensity ratio, it is possible to determine that an error of the number of photons of the first pulsed laser light corresponding to the second pulsed laser light is greater than a predetermined value when it is determined that the light intensity of the second pulsed laser light is not in the predetermined range. Therefore, at the time of generation of the quantum cryptographic key, the quantum cryptographic key input apparatus that has received the light pulse train and the specifying information can specify the first pulsed laser light having an error larger than a predetermined value using the specifying information, and exclude the first pulsed laser light. Thus, it is possible to improve the generation rate of the quantum cryptographic key.

Advantageous Effects Of Invention

According to the aspect of the present invention, it is possible to provide a quantum cryptographic key output apparatus, a quantum cryptographic key communication system, and a quantum cryptographic key output method capable of improving a generation rate of a quantum cryptographic key.

DESCRIPTION OF EMBODIMENTS

Hereinafter, preferred embodiments of a quantum cryptographic key output apparatus, a quantum cryptographic key communication system, and a quantum cryptographic key output method according to the present invention will be described in detail with reference to the drawings. It should be noted that in the embodiment, "stage before" means a side opposite to a transmission direction of pulsed laser light, and "stage after" means the transmission direction side of the pulsed laser light.

Figure 1:
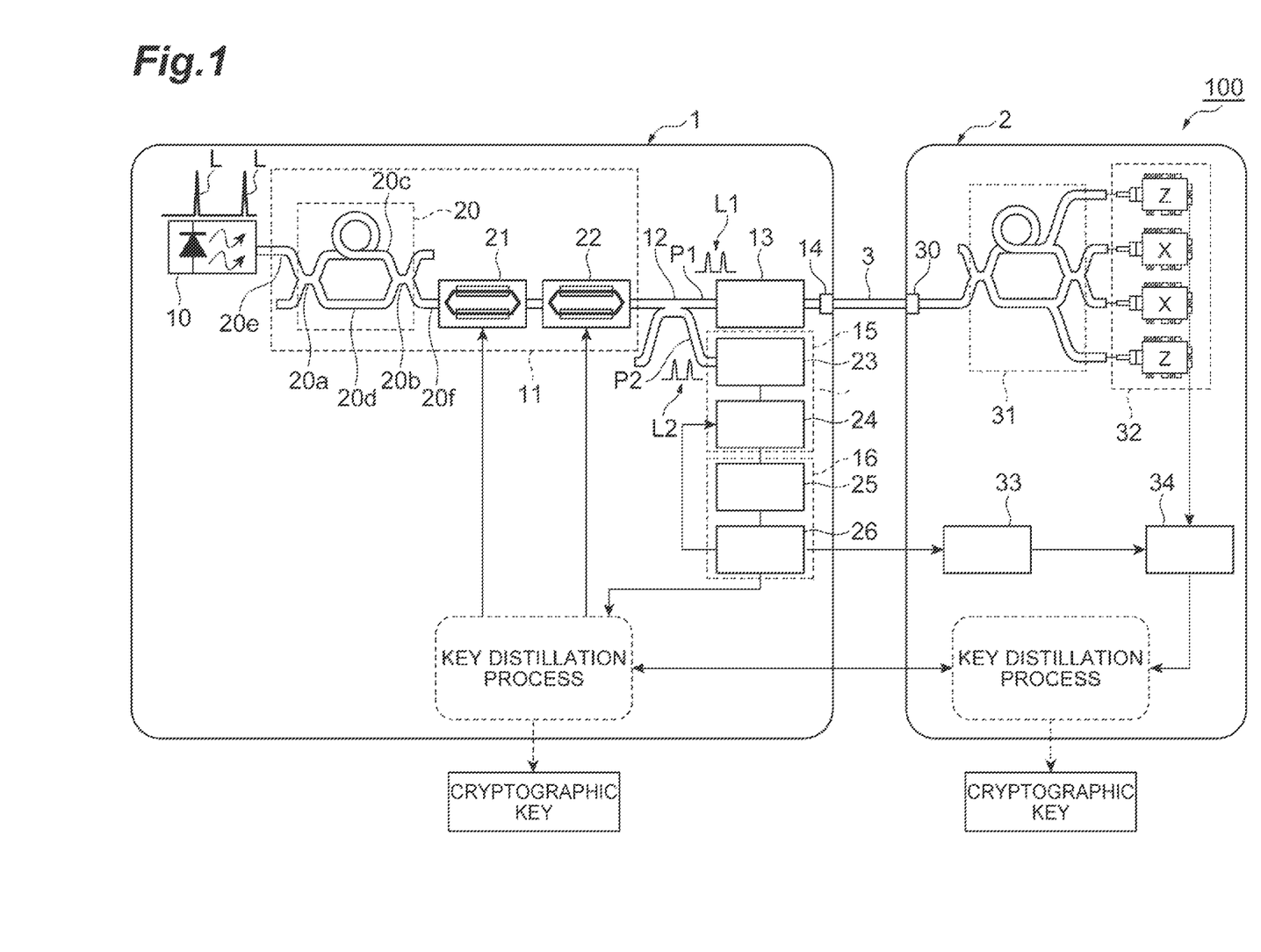
FIG. 1 is a schematic diagram illustrating a functional configuration of a quantum cryptographic key communication system according to an embodiment.

FIG. 1 is a schematic diagram illustrating a functional configuration of a quantum cryptographic key communication system according to the embodiment. As illustrated in FIG. 1, a quantum cryptographic key communication system 100 includes a quantum cryptographic key output apparatus 1 which is on the sender side, a quantum cryptographic key input apparatus 2 which is on the receiver side, and an optical transmission path 3 including an optical fiber or the like. The quantum cryptographic key communication system 100 is a system that shares information on a cryptographic key (hereinafter referred to as "cryptographic key information") consisting of digital bit strings in an information theoretical manner safe from tapping by a third party by communicating encoded pulsed laser light L between the quantum cryptographic key output apparatus 1 and the quantum cryptographic key input apparatus 2. The quantum cryptographic key output apparatus 1 generates encoded pulsed laser light L to be used for generation of a quantum cryptographic key and outputs a light pulse train consisting of the pulsed laser light L to the quantum cryptographic key input apparatus 2 via the optical transmission path 3. That is, the quantum cryptographic key output apparatus 1 encodes the light pulse and outputs the encoded light pulse to the quantum cryptographic key input apparatus 2 via the optical transmission path 3. The quantum cryptographic key input apparatus 2 receives a light pulse train consisting of the pulsed laser light L output by the quantum cryptographic key output apparatus 1.

The quantum cryptographic key output apparatus 1 generates a random number sequence and encrypts a message using cryptographic key information acquired on the basis of the generated random number sequence. Further, the quantum cryptographic key output apparatus 1 encodes the pulsed laser light L so that the pulsed laser light L has the cryptographic key information, and outputs the pulsed laser light L to the optical transmission path 3. It should be noted that the encrypted message is transmitted from the quantum cryptographic key output apparatus 1 to the quantum cryptographic key input apparatus 2 using arbitrary communication means such as the Internet. The optical transmission path 3 transmits the pulsed laser light L from the quantum cryptographic key output apparatus 1 to the quantum cryptographic key input apparatus 2. The quantum cryptographic key input apparatus acquires the cryptographic key from the cryptographic key information possessed by the pulsed laser light L input from the optical transmission path 3 and decrypts the encrypted message with the cryptographic key. Accordingly, according to the quantum cryptographic key communication system 100, it is possible to safely transmit information (hereinafter referred to as a "message") to be transmitted from the quantum cryptographic key output apparatus 1 to the quantum cryptographic key input apparatus 2 in an information theoretical manner.

First, the quantum cryptographic key output apparatus 1 of the quantum cryptographic key communication system 100 will be described. The quantum cryptographic key output apparatus 1 includes a semiconductor laser device (a light source) 10, an encoder 11, an optical branching unit 12, an attenuator (an attenuating unit) 13, a light output unit 14, a light intensity determination unit 15, an information output unit 16, and a random number sequence generation unit (not illustrated). The random number sequence generation unit is not limited to a specific configuration as long as the random number sequence generation unit can generate a physical random number that cannot be predicted in an information theoretical manner and can generate a random number sequence at a generation speed of, for example, several Gb/s or more.

The semiconductor laser device 10 pulse-oscillates light having a wavelength suitable for optical fiber transmission (for example, 1.55 μm), and repeatedly generates pulsed laser light L having a disordered phase for each pulse. The semiconductor laser device 10 repeatedly generates, for example, the pulsed laser light L at a clock frequency of a synchronization signal shared by the quantum cryptographic key output apparatus 1 and the quantum cryptographic key input apparatus 2. The semiconductor laser device 10 inputs the pulsed laser light L to the encoder 11.

The encoder 11 encodes the pulsed laser light L repeatedly input from the semiconductor laser device 10 on the basis of the quantum cryptographic key. The encoder 11 includes an interferometer 20, a phase modulation unit 21, and an intensity modulation unit 22. The phase modulation unit 21 is disposed at a stage after the interferometer 20, and the intensity modulation unit 22 is disposed at a stage after the phase modulation unit 21.

The interferometer 20 divides each piece of pulsed laser light L into a double pulse (a pair of pulses) having mutual coherence. The interferometer 20 includes an asymmetric Mach-Zehnder interferometer. The interferometer 20 includes an input terminal 20a, an output terminal 20b, and a first transmission path 20c and a second transmission path 20d connecting the input terminal 20a and the output terminal 20b. A transmission path length of the first transmission path 20c is longer than a transmission path length of the second transmission path 20d.

In addition, the interferometer 20 has a first port 20e connected to the input terminal 20a, and a second port 20f connected to the output terminal 20b. The semiconductor laser device 10 is connected to a stage before the first port 20e. On the other hand, the phase modulation unit 21 is connected to a stage after the second port 20f. It should be noted that although the interferometer 20 includes ports separate from the first port 20e and the second port 20f on the input terminal 20a side and the output terminal 20b side, nothing is connected to these ports.

The pulsed laser light L generated by the semiconductor laser device 10 reaches the input terminal 20a via the first port 20e and is separated into a double pulse consisting of a pulse transmitted in the first transmission path 20c and a pulse transmitted in the second transmission path 20d. The respective pulses constituting the double pulse are separated temporally and spatially while maintaining mutual coherence. Each pulse reaches the output terminal 20b and is output to the phase modulation unit 21 via the second port 20f.

The phase modulation unit 21 randomly modulates the phase of the pulsed laser light L forming a double pulse. More specifically, when the pulsed laser light L forming a double pulse is input, the phase modulation unit 21 modulates the phase of the pulsed laser light L such that a quantum state randomly selected on the basis of the random number generated by the random number sequence generation unit is obtained. It is possible for, for example, a known phase modulator to be applied as the phase modulation unit 21. The phase modulation unit 21 forms the double pulse and outputs the pulsed laser light L of which the phase has been modulated to the intensity modulation unit 22.

Here, it is preferable for a basis for describing the quantum state of the pulsed laser light L forming the double pulse to be selected as follows. First, in the pulsed laser light L forming the double pulse, a quantum state of a pulse to be transmitted ahead is described as $|0\rangle$, and a quantum state of a pulse to be transmitted later is described as $|1\rangle$, In this case, the quantum state of the pulsed laser light L is expressed by Equation (1) below.

[Math. 1]

$$\frac{1}{\sqrt{2}}(|0\rangle + |1\rangle) \quad (1)$$

Here, since it is assumed that Decoy BB84 protocol is used in quantum key distribution, an X base and a Z base may be adopted as bases. In this case, four states necessary for the Decoy BB84 protocol are expressed by Expressions (2), (3), and (4) below.

[Math. 2]

$$\frac{1}{\sqrt{2}}(|0\rangle \pm |1\rangle) \quad (2)$$

[Math. 3]

$$|0\rangle \quad (3)$$

[Math. 4]

$$|1\rangle \quad (4)$$

As described above, the phase modulation unit 21 randomly modulates the quantum state of the pulsed laser light L and assigns binarized bits of 0 or 1. In this case, each bit is described by either an X base or a Z base which is randomly selected.

The semiconductor laser device 10 repeatedly generates the pulsed laser light L. Therefore, the phase modulation unit 21 generates a bit string in which each binary bit of 0 or 1 has been randomly arranged. This bit string becomes a source of the cryptographic key.

The intensity modulation unit 22 randomly modulates the intensity (the number of photons) of the pulsed laser light L Which forms a double pulse and of which the phase has been modulated. More specifically, when the pulsed laser light L which forms the double pulse and of which the phase has been modulated is input, the intensity modulation unit 22 modulates the light intensity of the pulsed laser light L so that a desired average number of photons randomly selected on the basis of the random number generated by the random number sequence generation unit is obtained. It should be noted that the intensity modulation unit 22 modulates the light intensity so that the number of photons of the pulsed laser light L has any one of a plurality of candidate values that are values equal to or smaller than 1 by the pulsed laser light L further passing through the optical branching unit 12 and the attenuator 13. As the intensity modulation unit 22, a known modulator used in normal optical communication can be applied. For example, the intensity modulation unit 22 may be a Mach-Zehnder type modulator using a lithium nitrate (LN: LiNbO$_3$) crystal. The intensity modulation unit 22 outputs, to the optical branching unit 12, the pulsed laser light L Which forms a double pulse and of which the phase and the light intensity have been modulated (that is, the pulsed laser light L encoded on the basis of the quantum cryptographic key).

The optical branching unit 12 branches the encoded pulsed laser light L into a first optical path P1 and a second optical path P2 at a predetermined light intensity ratio. In the first optical path P1 the attenuator 13 is connected to a stage after the optical branching unit 12. In the second optical path. P2, the light intensity determination unit 15 is connected to a stage after the optical branching unit 12. For example, an optical fiber coupler can be used as the optical branching unit 12. Here, the optical branching unit 12 branches the pulsed laser light L1 so that a light intensity ratio between the first pulsed laser light L1 that is the pulsed laser light L branched to the first optical path P1 and the second pulsed laser light L2 that is the pulsed laser light L branched to the second optical path P2 becomes, for example, 1:9.

The attenuator 13 attenuates the light intensity of the first pulsed laser light L1 so that the average number of photons of the first pulsed laser light L1 has any one of a plurality of candidate values (for example, 0 photons, 0.1 photons, and 0.5 photons) that are values equal to or smaller than 1. Here, among the candidate values, 0.1 photons corresponds to the average number of photons of a Decoy pulse, and 0.5 photons corresponds to the average number of photons of a signal pulse. The attenuator 13 attenuates the light intensity of the first pulsed laser light L1 by about 60 dB, for example, when average power of the signal pulse output from the intensity modulation unit 22 is 0.32 mW. However, the average number of photons of the first pulsed laser light L1 attenuated by the attenuator 13 may include an error of, for example, about 5% to 10% with respect to any of the plurality of candidate values described above, A known attenuator can be applied as the attenuator 13, and the attenuator 13 is not limited to a specific configuration. The attenuator 13 outputs the first pulsed laser light L1 of which the light intensity has been attenuated to the light output unit 14.

The light output unit 14 outputs the first pulsed laser light L1 input by the attenuator 13 to the quantum cryptographic key input apparatus 2 via the optical transmission path 3. The light output unit 14 is not limited to a specific configuration as long as the encoded first pulsed laser light L1 can be output from the quantum cryptographic key output apparatus 1 to a subsequent stage, and may be, for example, a mere connection place between the first optical path P1 and the optical transmission path 3.

The light intensity determination unit 15 determines whether or not the light intensity of the second pulsed laser light L2 is in a predetermined range. Here, the predetermined range is such a range that the number of photons of the first pulsed laser light L1 is in a predetermined error range with respect to a plurality of candidate values when the first pulsed laser light L1 branched at a predetermined light intensity ratio with respect to the second pulsed laser light L2 in the optical branching unit 12 is further attenuated by the attenuator 13. For example, when the light intensity of the second pulsed laser light L2 is in a range of 275 µW or more and 300 µW or less, the light intensity determination unit 15 determines that the number of photons of the first pulsed laser light L1 is in an error range of 5% with respect to the candidate value 0.5 photons. On the other hand, when the light intensity of the second pulsed laser light L2 is not in the predetermined range, the number of photons of the first pulsed laser light L1 corresponding to the second pulsed laser light L2 at a stage after the attenuator 13 is not in the predetermined error range with respect to the plurality of candidate values.

Figure 2:
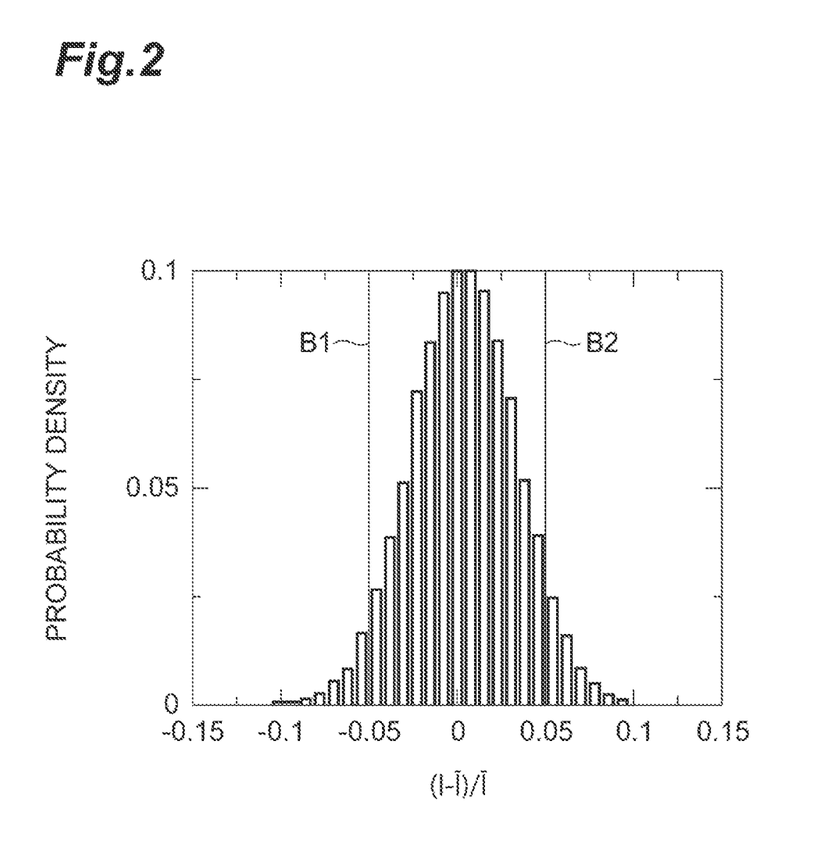
FIG. 2 is a graph of a simulation result illustrating a distribution of an actual number of photons of pulsed laser light constituting a quantum cryptographic key.

A predetermined error range for the plurality of candidate values will be described herein. FIG. 2 is a graph illustrating a distribution of an actual number of photons of the pulsed laser light constituting the quantum cryptographic key. A horizontal axis in FIG. 2 indicates a.

variation in the actual number of photons for the candidate value of the average number of photons, and a vertical axis in FIG. 2 indicates a probability density for each actual number of photons. In FIG. 2, an example is illustrated in which the actual number of photons of the pulsed laser light constituting the quantum cryptographic key has substantially a normal distribution. A line B1 in FIG. 2 indicates a threshold value at which the error becomes 5% on the side on which the number of photons is small with respect to the candidate value of the average number of photons. Further, a line B2 in FIG. 2 indicates a threshold value at which the error becomes 5% on the side on which the number of photons is large with respect to the candidate value of the average number of photons. As illustrated in FIG. 2, the actual number of photons of the pulsed laser light constituting the quantum cryptographic key has an error of 5% or more.

Figure 3:
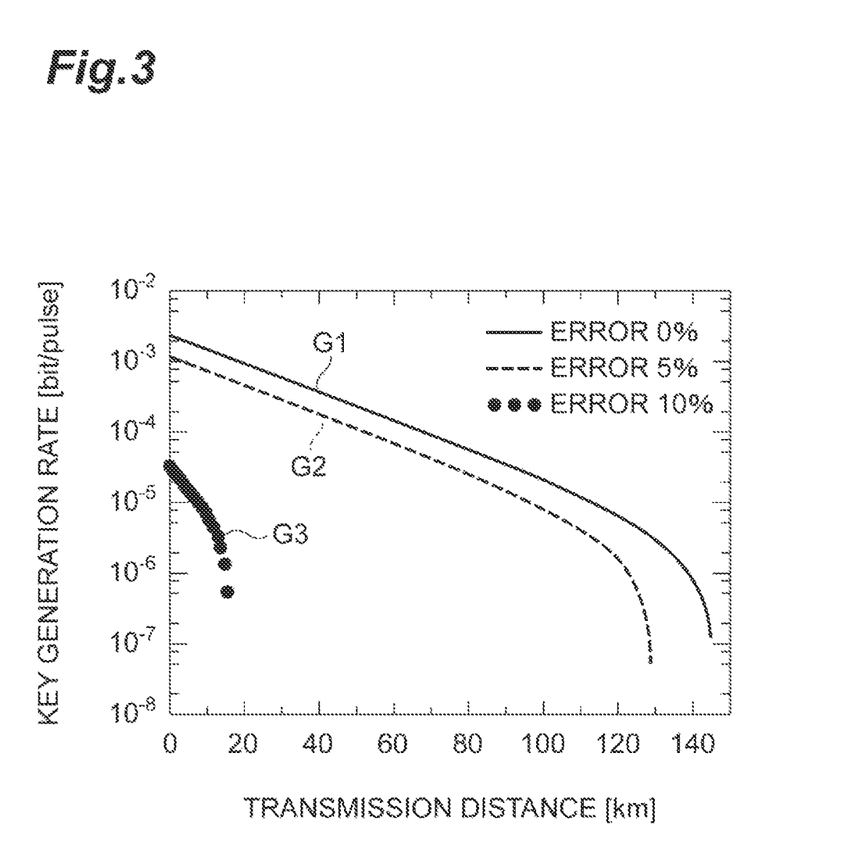
FIG. 3 is a graph illustrating an example of a cryptographic key generation rate according to an error of an actual number of photons of pulsed laser light in relation to a transmission distance.

FIG. 3 is a graph of a simulation result showing an example of a generation rate of the cryptographic key according to the error of the actual number of photons of the pulsed laser light in relation to a transmission distance. A horizontal axis of FIG. 3 indicates a transmission distance of the cryptographic key information, and a vertical axis of FIG. 3 illustrates the number of bits (a key generation rate per pulse) from which a cryptographic key with guaranteed security can be generated, in a case in which one piece of pulsed laser light L is transmitted from the quantum cryptographic key output apparatus 1 to the quantum cryptographic key input apparatus 2. A graph G1 in FIG. 3 illustrates simulation results when an error of the actual number of photons of the pulsed laser light L is 0%. A graph G2 in FIG. 3 illustrates simulation results when the error of the actual number of photons of the pulsed laser light L is 5%. A graph G3 in FIG. 3 illustrates simulation results when the error of the actual number of photons of the pulsed laser light L is 10%. It can be seen from comparison of the graph G1, with the graph G2 that, for example, in a range in which the transmission distance is about 120 km or less, the generation rate of the cryptographic key is decreased by only about 50% and a maximum transmission distance is shortened only to about 130 km from about 150 km when the error is 5% as compared with a case in which the error is 0%. On the other hand, it can be seen from comparison of the graph G1 with the graph G3 that when the error is 10%, the generation rate of the cryptographic key is greatly decreased and the maximum transmission distance is greatly shortened to about 20 km as compared with a case in which the error is 0%. As described above, it is preferable for an error range of the actual number of photons with respect to the candidate value of the actual number of photons in the pulsed laser light L constituting the quantum cryptographic key to be 5% or less.

Referring back to FIG. 1, the light intensity determination unit 15 includes a photodiode (a photoelectric conversion unit) 23 and a comparator (a comparison unit) 24. The photodiode 23 receives the second pulsed laser light L2 and outputs an electric signal according to a light intensity of the received second pulsed laser light L2 to the comparator 24. It is preferable for, particularly, a high-speed photodiode excellent in responsiveness to be used as the photodiode 23.

The comparator 24 determines whether or not the light intensity of the second pulsed laser light L2 related to the electric signal output by the photodiode 23 is in a predetermined range on the basis of the electric signal. When the comparator 24 determines that the light intensity of the second pulsed laser light L2 is not in the predetermined range, the comparator 24 outputs, to the information output unit 16, specifying information that is information including information on an order of the pieces of first pulsed laser light L1 corresponding to the second pulsed laser light L2 of which the light intensity is determined not to be in the predetermined range among the pieces of first pulsed laser light L1 related to the pulsed laser light L repeatedly generated by the semiconductor laser device 10. The specifying information is, for example, information on a position of the first pulsed laser light L1 corresponding to the second pulsed laser light L2 of which the light intensity is determined not to he in the predetermined range among a plurality of pieces of first pulsed laser light L1. A known comparator can be applied as the comparator 24, and the comparator 24 is not limited to a specific configuration.

The information output unit 16 includes a memory 25 that stores the specifying information and a specifying information output unit 26 that outputs the specifying information stored in the memory 25 to the quantum cryptographic key input apparatus 2. The memory 25 is not limited to a specific configuration as long as the specifying information can be temporarily stored. The specifying information output unit 26 reads the specifying information from the memory 25 and transmits the specifying information read from the memory 25 to the quantum cryptographic key input apparatus 2 using an arbitrary communication means such as the Internet. The specifying information output unit 26 is not limited to a specific configuration, and a known device can be adopted.

Next, the quantum cryptographic key input apparatus 2 will be described. The quantum cryptographic key input apparatus 2 includes a light input unit 30, a decoder 31, a photon detection unit 32, an information input unit 33, and a key distillation unit 34.

The light input unit 30 receives the first pulsed laser light L1 output by the light output unit 14. The light input unit 30 outputs the input first pulsed laser light L1 to the decoder 31. The decoder 31 distributes the pulsed laser light constituting each hit of the bit string serving as a source of the cryptographic key to each port of the photon detection unit 32 corresponding to the X base or the Z base on the basis of the input first pulsed laser light L1. The photon detection unit 32 generates each binary bit of 0 or 1 on the basis of the pulsed laser light input from the decoder 31. It should be noted that in the embodiment, the "cryptographic key" means a key including a digital bit string.

The information input unit 33 receives the specifying information output by the specifying information output unit 26 of the information output unit 16. The key distillation unit 34 excludes the first pulsed laser light L1 specified by the specifying information input by the information input unit 33 from among the pieces of first pulsed laser light L1 input by the light input unit 30, and uses the first pulsed laser light L1 as a new cryptographic key (a pulse exclusion process). Further, the key distillation unit 34 performs a key distillation process on the basis of the new cryptographic key. The light input unit 30, the decoder 31, the photon detection unit 32, and the information input unit 33 are not limited to specific configurations, and known devices can be adopted.

Figure 4:
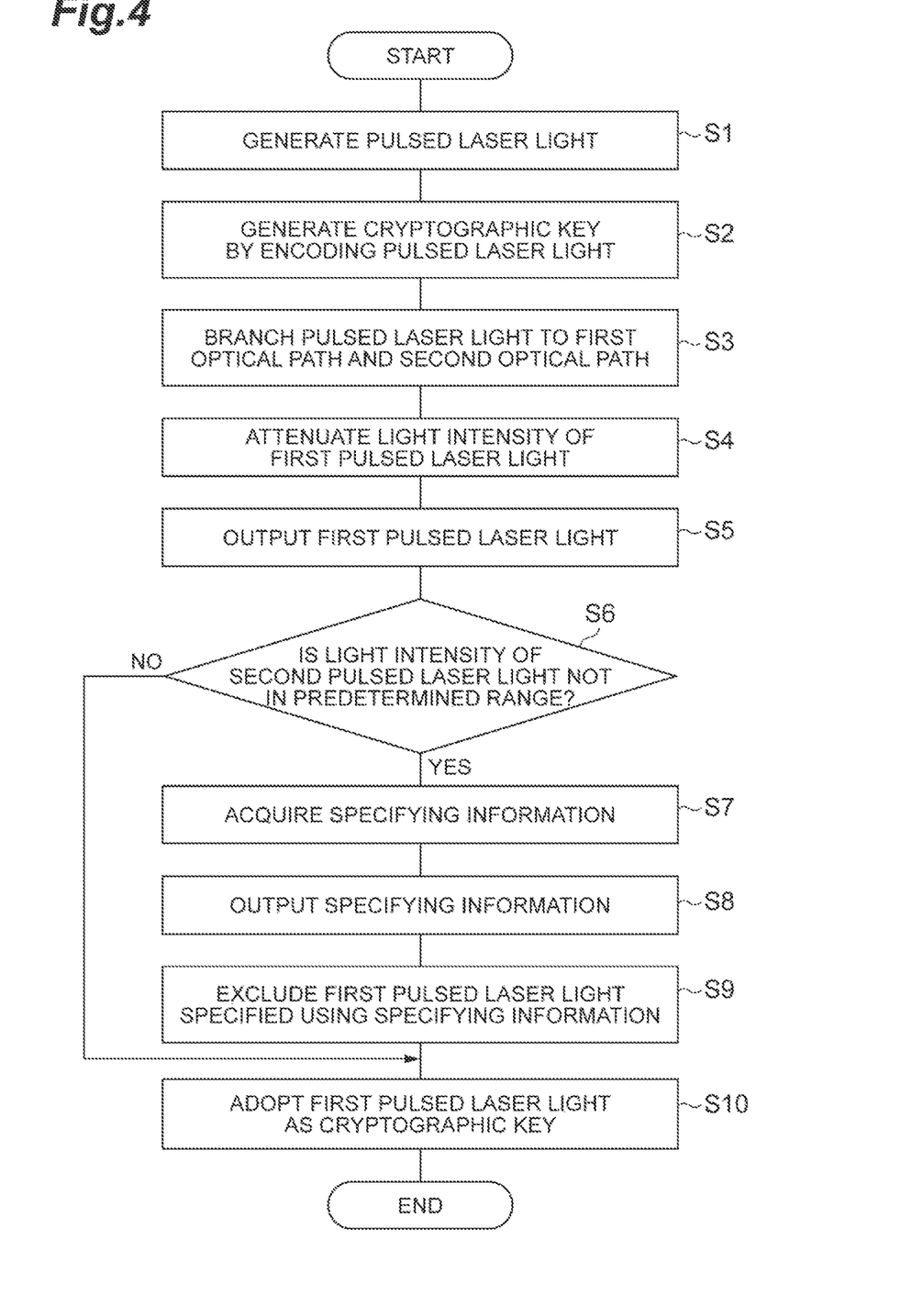
FIG. 4 is a flowchart illustrating a pulse exclusion process for a cryptographic key.

The quantum cryptographic key communication system 100 executes a pulse exclusion process to he described below. FIG. 4 is a flowchart illustrating a pulse exclusion process for the cryptographic key. First, in step S1, the pulsed laser light L is repeatedly generated by the semiconductor laser device 10 (a light emitting step).

Then, in step S2, the pulsed laser light L is encoded by the encoder 11 so that pulsed laser light L having cryptographic key information is generated (an encoding step). Then, in step S3, the encoded pulsed laser light L is branched by the optical branching unit 12 for a predetermined light intensity ratio between the first optical path P1 and the second optical path P2 (an optical branching step).

Then, in step S4, a light intensity of the first pulsed laser light L1 is attenuated by the attenuator 13 so that the number of photons of the first pulsed laser light L1 has any one of the plurality of candidate values that are values equal to or smaller than 1 (an attenuation step). Then, in step S5, the first pulsed laser light L1 of which the light intensity is attenuated is output to the quantum cryptographic key input apparatus 2 by the light output unit 14 (a light output step).

Then, in step S6, the light intensity determination unit 15 determines whether or not the light intensity of the second pulsed laser light L2 is in a predetermined range (a light intensity determination step). When it is determined that the light intensity of the second pulsed laser light L2 is not in the predetermined range, the process proceeds to step S7. On the other hand, when it is determined that the light intensity of the second pulsed laser light L2 is in the predetermined range, the process proceeds to step S10.

Then, in step S7, the information output unit 16 acquires specifying information for specifying the first pulsed laser light L1 corresponding to the second pulsed laser light L2 of which the light intensity is determined not to be in the predetermined range. Subsequently, in step S8, the information output unit 16 outputs the acquired specifying information to the quantum cryptographic key input apparatus 2 (an information output step). This is the quantum cryptographic key output method for generating the quantum cryptographic key using the quantum cryptographic key output apparatus 1 and outputting the quantum cryptographic key to the quantum cryptographic key input apparatus 2.

Subsequently, in step S9, the first pulsed laser light L1 specified using the specifying information input in the information input step is excluded from the first pulsed laser light L1 input in the light input step by the key distillation unit 34. Subsequently, in step S10, the key distillation unit 34 adopts the cryptographic key related to the quantum cryptographic key used for encoding of the first pulsed laser light L1 as a new cryptographic key. Thus, the pulse exclusion process in the quantum cryptographic key communication system 100 ends.

Subsequently, the quantum cryptographic key communication system 100 executes the key distillation process to be described below for the cryptographic key. The quantum cryptographic key output apparatus 1 transmits the bit string serving as a source of the cryptographic key to the quantum cryptographic key input apparatus 2 in steps S1 to S5 in the pulse exclusion process described above. Only a part of the transmitted pulsed laser light L reaches the quantum cryptographic key input apparatus 2 due to the loss during transmission. Therefore, in the quantum cryptographic key input apparatus 2, only a part of the hit string generated in the encoder 11 is constructed again. Thereafter, the quantum cryptographic key input apparatus 2 notifies the quantum cryptographic key output apparatus 1 of a port (position) of the photon detection unit 32 that has detected the pulsed laser light L. The bit string reconstructed in the quantum cryptographic key input apparatus 2 is used as a raw key (a cryptographic key).

Subsequently, the quantum cryptographic key output apparatus 1 executes base collation. That is, the quantum cryptographic key output apparatus 1 collates a base (a transmission base) used in the quantum cryptographic key output apparatus 1 with a base (a reception base) used in the quantum cryptographic key input apparatus 2. A bit string consisting of other bits obtained by excluding bits in which the transmission base is different from the reception base from the raw key is used as the shift key.

Subsequently the quantum cryptographic key input apparatus 2 releases a part of the shift key to the quantum cryptographic key output apparatus 1. The quantum cryptographic key output apparatus 1 estimates an error rate that is a rate at which the quantum cryptographic key input apparatus 2 has received erroneous bits with respect to the bits transmitted by the quantum cryptographic key output apparatus 1 on the basis of the released shift key.

Subsequently, the quantum cryptographic key output apparatus 1 and the quantum cryptographic key input apparatus 2 execute error correction. For the error correction, it is possible to use the same method as the method executed in normal communication.

Subsequently, the quantum cryptographic key output apparatus 1 and the quantum cryptographic key input apparatus 2 execute confidentiality enhancement. First, the quantum cryptographic key output apparatus 1 and the quantum cryptographic key input apparatus 2 estimate an upper limit value M of the number of bits in an N-bit shift key likely to have been tapped by a third party (amount of leakage information) on the basis of the estimated error rate. The quantum cryptographic key output apparatus 1 and the quantum cryptographic key input apparatus 2 randomly discard an M+s bits obtained by adding a constants to the upper limit value M from the N-bit shift key, and sets the remainder as a final key. As a result, a probability of a tapping person being able to acquire the final key can be reduced to $2^{-s}$ or less.

Incidentally, the bits randomly discarded from the shift key are selected using a universal hash function. As the universal hash function, it is possible to use a matrix in which a value (0, 1) of each component has randomly been selected on the basis of the random number generated by the random number sequence generation unit.

Using the final key acquired as described above, the quantum cryptographic key input apparatus 2 decrypts the encrypted message.

As described above, in any one of the quantum cryptographic key output apparatus 1, the quantum cryptographic key communication system 100, and the quantum cryptographic key output method, the encoder 11 encodes the pulsed laser light L generated repetitively the semiconductor laser device 10 on the basis of the quantum cryptographic key, and the optical branching unit 12 branches the pulsed laser light L to the first optical path P1 and the second optical path P2 at a predetermined light intensity ratio. The attenuator 13 attenuates the light intensity of the first pulsed laser light L1 which is the pulsed laser light L branched to the first optical path P1, and the light output unit 14 outputs a light pulse train consisting of the first pulsed laser light L1 to the quantum cryptographic key input apparatus 2. Here, when the light intensity determination unit 15 determines that the light intensity of the second pulsed laser light L2 which is the pulsed laser light L branched to the second optical path P2 is not in the predetermined range, the information output unit 16 outputs specifying information for specifying the first pulsed laser light L1 corresponding to the second pulsed laser light L2 to the quantum cryptographic key input apparatus 2. Since the first pulsed laser light L1 and the second pulsed laser light L2 are pulsed laser light obtained by the optical branching unit 12 branching the same pulsed laser light L at a predetermined light intensity ratio, it is possible to determine that an error of the average number of photons of the first pulsed laser light L1 corresponding to the second pulsed laser light L2 is greater than the predetermined value when the light intensity of the second pulsed laser light L2 is determined not to be in the predetermined range. Therefore, at the time of generation of the quantum cryptographic key, the quantum cryptographic key input apparatus 2 that has received the light pulse train consisting of the first pulsed laser light L1 and the specifying information can specify the first pulsed laser light L1 having an error larger than a predetermined value using the specifying information, and exclude the first pulsed laser light L1. Thus, it is possible to improve the generation rate of the quantum cryptographic key.

In the quantum cryptographic key output apparatus 1, the light intensity determination unit 15 includes the photodiode 23 that receives the second pulsed laser light L2 and outputs the electric signal according to the light intensity of the received second pulsed laser light L2, and the comparator 24 that determines whether or not the light intensity of the second pulsed laser light L2 related to the electric signal output by the photodiode 23 is in a predetermined range on the basis of the electric signal. Therefore, it is possible to suitably exhibit the operation and effect described, above.

Further, in the quantum cryptographic key output apparatus 1, the specifying information includes information on an order of the pieces of first pulsed laser light L1 corresponding to the second pulsed laser light L2 of Which the light intensity is determined not to be in the predetermined range by the light intensity determination unit 15 among the pieces of first pulsed laser light L1 related to the pulsed laser light L repeatedly generated by the semiconductor laser device 10. Therefore, when a proportion of the pieces of second pulsed laser light L2 of which the light intensity is determined not to be in the predetermined range by the light intensity determination unit 15 among the pieces of second pulsed laser light L2 is lower than a proportion of the second pulsed laser light L2 of which the light intensity is determined to he in the predetermined range by the light intensity determination unit 15, it is possible to reduce the amount of the specifying information.

Further, in the quantum cryptographic key output apparatus 1, the encoder 11 includes the interferometer 20 that divides the pulsed laser light L into a pair of pulses having mutual coherence, the phase modulation unit 21 that modulates the phase of the pulsed laser light L, and the intensity modulation unit 22 that modulates the light intensity of the pulsed laser light L, in which the pulsed laser light L is encoded by dividing the pulsed laser light L into a pair of pulses using the interferometer 20, modulating the phase of the pulsed laser light L using the phase modulation unit 21, and modulating the light intensity of the pulsed laser light L using the intensity modulation unit 22. Therefore, it is possible to suitably exhibit the above operation and effects by adopting the time-bin encoding scheme.

Further, in the quantum cryptographic key output apparatus 1, the phase modulation unit 21 is disposed at a stage after the interferometer 20. Therefore, it is possible to suitably exhibit the operation and effects described above.

The embodiment in which the quantum cryptographic key output apparatus, quantum cryptographic key communication system, and quantum cryptographic key output method according to the present invention has described above. Therefore, the quantum cryptographic key output apparatus, the quantum cryptographic key communication system, and the quantum cryptographic key output method according to the present invention are not limited to the quantum cryptographic key output apparatus 1, the quantum cryptographic key communication system 100, and the quantum cryptographic key output method, and can he arbitrarily modified without departing from the gist of each claim.

For example, the specifying information may include information on an order of the pieces of first pulsed laser light L1 corresponding to the second pulsed laser light L2 of which the light intensity is determined to be in the predetermined range by the light intensity determination unit 15 among the pieces of first pulsed laser light L1 related to the pulsed laser light L repeatedly generated by the semiconductor laser device 10. In this case, when the proportion of the pieces of second pulsed laser light L2 of which the light intensity is determined not to be in the predetermined range by the light intensity determination unit 15 among the pieces of second pulsed laser light L2 is higher than the proportion of the second pulsed laser light L2 of which the light intensity is determined to be in the predetermined range by the light intensity determination unit 15, it is possible to reduce the amount of the specifying information.

Further, an order of the interferometer 20, the phase modulation unit 21, the intensity modulation unit 22, the optical branching unit 12, and the attenuator 13 is not limited to the order according to the above embodiment. More specifically, in these orders, the optical branching unit 12 may be at a stage after the intensity modulation unit 22 and at a stage before the attenuator 13, and the phase modulation unit 21 may be at a stage after the interferometer 20. Other order can be changed.

Further, in the above embodiment, the encoder 11 adopts a time-bin encoding scheme. However, the encoder 11 may be configured so as to be able to code the pulsed laser light L on the basis of the quantum cryptographic key, and is not limited to the configuration described above. For example, the encoder 11 may be configured to adopt an encoding scheme using polarized light.

Further, the optical transmission path 3 may not include an optical fiber. In this case, the quantum cryptographic key output apparatus 1 and the quantum cryptographic key input apparatus 2 may transmit photons having cryptographic key information, for example, via space. Further, the interferometer 11 may be another type of interferometer such as an asymmetric Michelson interferometer.

Further, in the above embodiment, in the confidentiality enhancement, when bits to be randomly discarded from the shift key are selected, the universal hash function using the matrix in which the value (0, 1) of each component is randomly selected on the basis of the random number generated by the random number sequence generation unit has been used. However, when bits to be randomly discarded from the shift key are selected, a plurality of universal hash functions may be stored in the quantum cryptographic key output apparatus 1 and the quantum cryptographic key input apparatus 2 in advance, and the universal hash function to be applied may be selected on the basis of the random number generated by the random number sequence generation unit.

Further, although the X base and the Z base are adopted as the base of the quantum state of the double pulse in the above embodiment, the X base and the Y base may be adopted as the base of the quantum state of the double pulse. In this case, four states necessary for the Decoy BB84 protocol are expressed by Expressions (5) and (6) below.

[Math. 5]

$$\frac{1}{\sqrt{2}}(|0\rangle \pm |1\rangle) \quad (5)$$

[Math. 6]

$$\frac{1}{\sqrt{2}}(|0\rangle \pm i|1\rangle) \quad (6)$$

Here, in a quantum cryptographic key generation apparatus according to an aspect of the present invention, the light intensity determination unit may include a photoelectric conversion unit that receives second pulsed laser light and outputs an electric signal according to a light intensity of the received second pulsed laser light, and a comparison unit that determines whether or not the light intensity of the second pulsed laser light related to the electric signal output by the photoelectric conversion unit is in a predetermined range on the basis of the electric signal. In this case, it is possible to suitably exhibit the above operation and effect.

In the quantum cryptographic key generation apparatus according to an aspect of the present invention, the specifying information may include information on an order of the pieces of first pulsed laser light corresponding to the second pulsed laser light of which the light intensity is determined not to be in the predetermined range by the light intensity determination unit among the pieces of first pulsed laser light related to the pulsed laser light repeatedly generated by the light source. In this case, when a proportion of the second pulsed laser light of which the light intensity is determined not to be in the predetermined range by the light intensity determination unit among the pieces of second pulsed laser light is lower than a proportion of the second pulsed laser light of which the light intensity is determined to be in the predetermined range by the light intensity determination unit, it is possible to reduce the amount of the specifying information.

In the quantum cryptographic key generation apparatus according to an aspect of the present invention, the specifying information may include information on an order of the pieces of first pulsed laser light corresponding to the second pulsed laser light of which the light intensity is determined to he in the predetermined range by the light intensity determination unit among the pieces of first pulsed laser light related to the pulsed laser light repeatedly generated by the light source. In this case, when a proportion of the second pulsed laser light of which the light intensity is determined not to be in the predetermined range by the light intensity determination unit among the pieces of second pulsed laser light is higher than a proportion of the second pulsed laser light of which the light intensity is determined to be in the predetermined range by the light intensity determination unit, it is possible to reduce the amount of the specifying information.

In the quantum cryptographic key generation apparatus according to an aspect of the present invention, the encoder may include an interferometer that divides pulsed laser light into a pair of pulses having mutual coherence, a phase modulation unit that modulates a phase of the pulsed laser light, and an intensity modulation unit that modulates the light intensity of the pulsed laser light, in which the pulsed laser light may be encoded by dividing the pulsed laser light into a pair of pulses using the interferometer, modulating the phase of the pulsed laser light using the phase modulation unit, and modulating the light intensity of the pulsed laser light using the intensity modulation unit. In this case, it is possible to suitably exhibit the above operation and effects by adopting a time-bin encoding scheme.

In the quantum cryptographic key generation apparatus according to an aspect of the present invention, the phase modulation unit may be disposed at a stage after the interferometer. In this case, it is possible to suitably exhibit the above operation and effects.

INDUSTRIAL APPLICABILITY it is possible to provide a quantum cryptographic key output apparatus, a quantum cryptographic key communication system, and a quantum cryptographic key output method capable of improving a generation rate of a quantum cryptographic key.

REFERENCE SIGNS LIST

1: Quantum cryptographic key output apparatus
2: Quantum cryptographic key input apparatus
10: Semiconductor laser device (light source)
11: Encoder
12: Optical branching unit
13: Attenuator (attenuation unit)
14: Light output unit
15: Light intensity determination unit
16: information output unit
20: Interferometer
21: Phase modulation unit
22: Intensity modulation unit
23: Photodiode (photoelectric conversion unit)
24: Comparator (comparison unit)
30: Light input unit
33: Information input unit
34: Key distillation unit
100: Quantum cryptographic key communication system
L: Pulsed laser light
L1: First pulsed laser light
L2: Second pulsed laser light
P1: First optical path
P2: Second optical path

The invention claimed is:
1. A quantum cryptographic key output apparatus that generates encoded pulsed laser light to be used for generation of a quantum cryptographic key and outputs a light pulse train consisting of the pulsed laser light to a quantum cryptographic key input apparatus, the quantum cryptographic key output apparatus comprising:
 a light source that repeatedly generates the pulsed laser light;
 an encoder that encodes the pulsed laser light on the basis of the quantum cryptographic key;
 an optical branching unit that branches the encoded pulsed laser light to a first optical path and a second optical path at a predetermined light intensity ratio;
 an attenuation unit that attenuates a light intensity of first pulsed laser light that is the pulsed laser light branched to the first optical path so that the number of photons of the first pulsed laser light has any one of a plurality of candidate values that are values equal to or smaller than 1;
 a light output unit that outputs the first pulsed laser light of which the light intensity has been attenuated by the attenuation unit to the quantum cryptographic key input apparatus;

a light intensity determination unit that determines whether or not a light intensity of a second pulsed laser light that is the pulsed laser light branched to the second optical path is in a predetermined range; and an information output unit that outputs specifying information for specifying the first pulsed laser light corresponding to the second pulsed laser light of which the light intensity is determined not to be in the predetermined range by the light intensity determination unit to the quantum cryptographic key input apparatus.

2. The quantum cryptographic key output apparatus according to claim 1, wherein the light intensity determination unit includes
a photoelectric conversion unit that receives the second pulsed laser light and outputs an electric signal according to a light intensity of the received second pulsed laser light; and
a comparison unit that determines whether or not the light intensity of the second pulsed laser light related to the electric signal output by the photoelectric conversion unit is in a predetermined range on the basis of the electric signal.

3. The quantum cryptographic key output apparatus according to claim 1, wherein the specifying information includes information on an order of pieces of first pulsed laser light corresponding to the second pulsed laser light of which the light intensity is determined not to be in a predetermined range by the light intensity determination unit among pieces of first pulsed laser light related to the pulsed laser light repeatedly generated by the light source.

4. The quantum cryptographic key output apparatus according to claim 1, wherein the specifying information includes information on an order of pieces of first pulsed laser light corresponding to the second pulsed laser light of which the light intensity is determined to be in a predetermined range by the light intensity determination unit among pieces of first pulsed laser light related to the pulsed laser light repeatedly generated by the light source.

5. The quantum cryptographic key output apparatus according to claim 1, wherein the encoder includes
an interferometer that divides the pulsed laser light into a pair of pulses having mutual coherence;
a phase modulation unit that modulates a phase of the pulsed laser light; and
an intensity modulation unit that modulates the light intensity of the pulsed laser light, and
the pulsed laser light is encoded by dividing the pulsed laser light into the pair of pulses using the interferometer, modulating the phase of the pulsed laser light using the phase modulation unit, and modulating the light intensity of the pulsed laser light using the intensity modulation unit.

6. The quantum cryptographic key output apparatus according to claim 5, wherein the phase modulation unit is disposed at a stage after the interferometer.

7. A quantum cryptographic key communication system comprising:

the quantum cryptographic key output apparatus according to claim 1, and
a quantum cryptographic key input apparatus that receives the light pulse train output by the quantum cryptographic key output apparatus,
wherein the quantum cryptographic key input apparatus includes
a light input unit that receives the first pulsed laser light output by the light output unit,
an information input unit that receives the specifying information output by the information output unit, and
a key distillation unit that excludes the first pulsed laser light that is specified by the specifying information received by the information input unit from the first pulsed laser light received by the light input unit, and uses the first pulsed laser light as a new quantum cryptographic key.

8. A quantum cryptographic key output method for generating encoded pulsed laser light to be used for generation of a quantum cryptographic key and outputting a light pulse train consisting of the pulsed laser light to a quantum cryptographic key input apparatus, the quantum cryptographic key output method comprising:

an emission step of repeatedly generating the pulsed laser light;
an encoding step of encoding the pulsed laser light on the basis of the quantum cryptographic key;
an optical branching step of branching the encoded pulsed laser light to a first optical path and a second optical path at a predetermined light intensity ratio;
an attenuation step of attenuating a light intensity of first pulsed laser light that is the pulsed laser light branched to the first optical path so that the number of photons of the first pulsed laser light has any one of a plurality of candidate values that are values equal to or smaller than 1;
a light output step of outputting the first pulsed laser light of which the light intensity has been attenuated to the quantum cryptographic key input apparatus;
a light intensity determination step of determining whether or not a light intensity of second pulsed laser light that is the pulsed laser light branched to the second optical path is in a predetermined range; and
an information output step of outputting specifying information for specifying the first pulsed laser light corresponding to the second pulsed laser light of which the light intensity is determined not to be in the predetermined range to the quantum cryptographic key input apparatus.

* * * * *